US006415326B1

(12) United States Patent
Gupta et al.

(10) Patent No.: US 6,415,326 B1
(45) Date of Patent: Jul. 2, 2002

(54) TIMELINE CORRELATION BETWEEN MULTIPLE TIMELINE-ALTERED MEDIA STREAMS

(75) Inventors: Anoop Gupta, Woodinville; Nosakhare D. Omoigui, Redmond; Li-Wei He, Bellevue, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/153,749

(22) Filed: Sep. 15, 1998

(51) Int. Cl.[7] .............................. G06F 15/16; H04N 7/08
(52) U.S. Cl. ......................... 709/231; 709/246; 725/32
(58) Field of Search ................................. 709/231, 219, 709/230, 217, 246; 725/32, 36

(56) References Cited

U.S. PATENT DOCUMENTS

| 4,931,950 A | 6/1990 | Isle et al. ............... 364/513 |
|---|---|---|
| 5,050,161 A | 9/1991 | Golestani ................. 370/60 |

(List continued on next page.)

FOREIGN PATENT DOCUMENTS

| EP | 0605115 | 7/1994 |
|---|---|---|
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 10/1997 |
| WO | WO 94/01964 | 1/1994 |
| WO | WO 98/37698 | 8/1998 |

OTHER PUBLICATIONS

Hardman et al., 1995, "Multimedia authoring paradigms", IEEE Colloquium on Authoring and Application of Hypermedia–Based User–Interfaces, pp. 8/1–8/3.*

Dionisio et al., Sep.–Oct. 1998, "A Unified data model for Representing Multimedia, Timeline, and Simulation data", IEEE Transaction on Knowledge and Data Engineering, pp. 746–767.*

H.J. Chen et al., "A Scalable Video–on–Demand Service for the Provision of VCR–Like Functions," IEEE, May 15, 1995, pp. 65–72.

Microsoft Corporation and RealNetworks, Inc., Advanced Streaming Format (ASF) Specification, Feb. 26, 1998, Public Specification Version 1.0, 55 pages.

Informedia—Internet References, http://www.informedia.cs.cmu.edu, date unknown.

"GSM Full Rate Speech Transcoding, " ETSI/PT 12, Feb. 1992, pp. 1–93.

"Speech Codec for the European Mobile Radio System," P. Vary et al., 1998, pp. 227–230.

(List continued on next page.)

*Primary Examiner*—Le Hien Luu
*Assistant Examiner*—Marc D. Thompson
(74) *Attorney, Agent, or Firm*—Lee & Hayes, PLLC

(57) ABSTRACT

A network client such as a streaming multimedia player is provided with the capability of changing playback speeds of a multimedia data stream. To change the playback speed, the client requests a different media stream. The client then initiates the new media stream at a point that corresponds in content to the point in the original data stream at which the speed change was requested. To determine the appropriate presentation time in the new media stream, the client refers to a first set of mappings, that maps presentation times in the original media stream to time-correlated presentation times in a primary or reference media stream. The client then refers to a second set of mappings, associated with the primary reference stream, to determine a time-correlated presentation time in the new media stream. The client then initiates playback of the new media stream at the determined presentation time.

26 Claims, 5 Drawing Sheets

U.S. PATENT DOCUMENTS

| | | | |
|---|---|---|---|
| 5,119,474 A | 6/1992 | Beitel et al. | 395/154 |
| 5,274,758 A | 12/1993 | Beitel et al. | 395/154 |
| 5,309,562 A | 5/1994 | Li | 395/200 |
| 5,313,454 A | 5/1994 | Bustini et al. | 370/13 |
| 5,341,474 A | 8/1994 | Gelman et al. | 395/200 |
| 5,414,455 A | 5/1995 | Hooper et al. | 348/7 |
| 5,434,848 A | 7/1995 | Chimento, Jr. et al. | 370/17 |
| 5,455,910 A | 10/1995 | Johnson et al. | 395/650 |
| 5,481,542 A | 1/1996 | Logston et al. | 370/94.2 |
| 5,490,252 A | 2/1996 | Macera et al. | 395/200.01 |
| 5,504,744 A | 4/1996 | Adams et al. | 370/60.1 |
| 5,519,701 A | 5/1996 | Colmant et al. | 370/60.1 |
| 5,521,630 A | 5/1996 | Chen et al. | 348/7 |
| 5,533,021 A | 7/1996 | Branstad et al. | 370/60.1 |
| 5,537,408 A | 7/1996 | Branstad et al. | 370/79 |
| 5,541,955 A | 7/1996 | Jacobsmeyer | 375/222 |
| 5,559,942 A | 9/1996 | Gough et al. | 395/155 |
| 5,566,175 A | 10/1996 | Davis | 370/84 |
| 5,574,724 A | 11/1996 | Bales et al. | 370/68.1 |
| 5,614,940 A | 3/1997 | Cobbley et al. | 348/7 |
| 5,617,423 A | 4/1997 | Li et al. | 370/426 |
| 5,623,690 A | 4/1997 | Palmer et al. | 395/806 |
| 5,625,405 A | 4/1997 | DuLac et al. | 348/7 |
| 5,640,320 A | 6/1997 | Jackson et al. | 364/192 |
| 5,664,227 A | 9/1997 | Mauldin et al. | 395/778 |
| 5,692,213 A | 11/1997 | Goldberg et al. | 395/806 |
| 5,717,691 A | 2/1998 | Dighe et al. | 370/401 |
| 5,717,869 A | 2/1998 | Moran et al. | 395/339 |
| 5,719,786 A * | 2/1998 | Nelson et al. | 709/219 |
| 5,721,829 A | 2/1998 | Dunn et al. | 395/200.49 |
| 5,742,347 A | 4/1998 | Kandlur et al. | 348/426 |
| 5,768,533 A | 6/1998 | Ran | 395/200.77 |
| 5,786,814 A * | 7/1998 | Moran et al. | 345/328 |
| 5,794,210 A | 8/1998 | Goldhaber et al. | 705/14 |
| 5,794,249 A | 8/1998 | Orsolini et al. | 707/104 |
| 5,799,292 A | 8/1998 | Hekmatpour | 706/11 |
| 5,801,685 A | 9/1998 | Miller et al. | 345/302 |
| 5,808,662 A * | 9/1998 | Kinney et al. | 348/14.1 |
| 5,818,510 A | 10/1998 | Cobbley et al. | 348/7 |
| 5,822,537 A * | 10/1998 | Katseff et al. | 709/231 |
| 5,828,848 A | 10/1998 | MacCormack et al. | 395/200.77 |
| 5,835,495 A | 11/1998 | Ferriere | 370/465 |
| 5,835,667 A | 11/1998 | Wactlar et al. | 386/96 |
| 5,838,906 A | 11/1998 | Doyle et al. | 395/200.32 |
| 5,859,641 A | 1/1999 | Cave | 345/348 |
| 5,864,682 A | 1/1999 | Porter et al. | 395/200.77 |
| 5,870,755 A | 2/1999 | Stevens et al. | 707/104 |
| 5,873,735 A | 2/1999 | Yamada et al. | 434/316 |
| 5,892,506 A | 4/1999 | Hermanson | 345/302 |
| 5,903,673 A | 5/1999 | Wang et al. | 382/236 |
| 5,918,002 A | 6/1999 | Klemets et al. | 395/182.16 |
| 5,930,787 A | 7/1999 | Minakuchi et al. | 707/4 |
| 5,953,506 A * | 9/1999 | Kalra et al. | 709/231 |
| 5,956,716 A | 9/1999 | Kenner et al. | 707/10 |
| 5,995,941 A | 11/1999 | Maquire et al. | 705/10 |
| 5,999,979 A | 12/1999 | Vellanki et al. | 709/232 |
| 6,006,241 A | 12/1999 | Purnaveja et al. | 707/512 |
| 6,014,706 A * | 1/2000 | Cannon et al. | 709/231 |
| 6,023,731 A | 2/2000 | Chawla | 709/231 |
| 6,032,130 A | 2/2000 | Alloul et al. | 705/27 |
| 6,035,341 A * | 3/2000 | Nunally et al. | 709/253 |
| 6,041,345 A | 3/2000 | Levi et al. | 709/217 |
| 6,069,794 A * | 3/2000 | McLaren et al. | 386/68 |
| 6,049,823 A | 4/2000 | Hwang | 709/218 |
| 6,118,450 A | 9/2000 | Proehl et al. | 345/349 |
| 6,118,817 A | 9/2000 | Wang | 375/240 |
| 6,128,653 A | 10/2000 | Del Val et al. | 709/219 |
| 6,133,920 A | 10/2000 | DeCarmo et al. | 345/354 |
| 6,144,375 A | 11/2000 | Jain et al. | 345/302 |
| 6,148,304 A | 11/2000 | de Vries et al. | 707/104 |
| 6,154,771 A | 11/2000 | Rangan et al. | 709/217 |
| 6,166,314 A | 12/2000 | Weinstock et al. | 84/483.1 |
| 6,173,317 B1 | 1/2001 | Chaddha et al. | 709/219 |
| 6,204,840 B1 | 3/2001 | Petelycky et al. | 345/302 |
| 6,215,910 B1 | 4/2001 | Chaddha | 382/253 |
| 6,230,172 B1 | 5/2001 | Purnaveja et al. | 707/512 |
| 6,233,389 B1 * | 5/2001 | Barton et al. | 386/46 |

OTHER PUBLICATIONS

Arons, Barry, "SpeechSkimmer: A System for Interactively Skimming Recorded Speech", ACM Transactions on Computer–Human, vol. 4, No. 1, pp. 3–38.

Internet Reference "An Annotated Bibliography of Interactive Speech User Interfaces by Barry Arons" HTTP://barons.www.media.mit.edu/people/barons/AronsAnnotatedBibliography.html, Date unknown.

* cited by examiner

TIMELINE CORRELATION BETWEEN MULTIPLE TIMELINE-ALTERED MEDIA STREAMS

TECHNICAL FIELD

This invention relates to techniques of storing and rendering streaming multimedia content at different speeds, and for correlating timelines of media streams that have been timeline-altered by varying techniques and degrees.

BACKGROUND OF THE INVENTION

Multimedia streaming-the continuous delivery of synchronized media data like video, audio, text, and animation- is a critical link in the digital multimedia revolution. Today, streamed media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file: text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments. The term "streaming" is used to indicate that the data representing the various media types is provided over a network to a client computer on a realtime, as-needed basis, rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

A U.S. Patent Application entitled "Multimedia Timeline Modification in Networked Client/Server Systems," filed Sep. 15, 1998, Ser. No. 09/153,664, by inventors Anoop Gupta and Nosa D. Omoigui, describes a system that allows a user to vary the playback speed of streaming multimedia content using time-scale modification technology. It was noted that both linear and non-linear timeline alteration techniques might be used.

When using linear techniques, time modification is applied consistently in times and across all individual streams of a composite media stream. With non-linear techniques, on the other hand, some segments of an individual or composite stream might be more highly expanded or compressed (in time) than other segments. This presents problems in switching and synchronizing between different versions of streams that have been non-linearly altered by different amounts or through the use of different non-linear techniques. These problems are addressed by the invention.

SUMMARY OF THE INVENTION

The invention utilizes time-scale modification so that a user can vary the speed of streaming content without destroying its intelligibility. In accordance with the invention, a user selects multimedia content from a menu presented at a network client computer. In addition, the user selects a playback speed, indicating the speed at which the multimedia should be rendered relative to its default speed. In the case of non-linearly altered streams, the user selects from available levels of alteration, such as "normal," "pauses removed," and "summary" levels of non-linear time compression.

Multiple versions of the requested multimedia content are stored at a server. In response to the selected playback speed or selected level of non-linear compression, the appropriate version is streamed to the client computer.

In addition to storing multiple versions of the multimedia content, the server maintains data structures that indicate timeline correlations between the various stored versions. The client refers to these stored timeline correlations when changing between the versions in response to client requests, so that playback can be started anew with a new stream at the point in the content where the change was requested by the client.

In the embodiment described herein, one version of the multimedia stream is considered to be a primary or reference version. This is usually the version having an unaltered timeline, corresponding to a 1.0 speed factor. Associated with this primary media stream is a table or other data object that is indexed by the presentation times of the primary media stream. For each presentation time of the primary media stream, the table indicates the timeline-correlated presentation times of the other, timeline-altered, media streams.

In addition, further data objects or elements are provided in conjunction with the timeline-altered media streams. These data objects are indexed by the presentation times of the timeline-altered media stream, and map such presentation times to the time-correlated presentation times of the primary media stream. One way to index these data objects is to associate and send them with the actual data units of the time-altered media streams.

When switching playback from a first time-altered media stream to a second time-altered media stream, the client stops the first media stream and notes the presentation time (in the first media stream) at which playback was stopped. The client then refers to the table associated with the first media stream and from it determines the timeline-correlated presentation time in the primary media stream. With that information, the client refers to the table associated with the primary media stream, and determines the time-correlated presentation time in the second media stream. The client then initiates playback of the second media stream at or before this time-correlated presentation time.

DETAILED DESCRIPTION

General Network Structure

Figure 1:
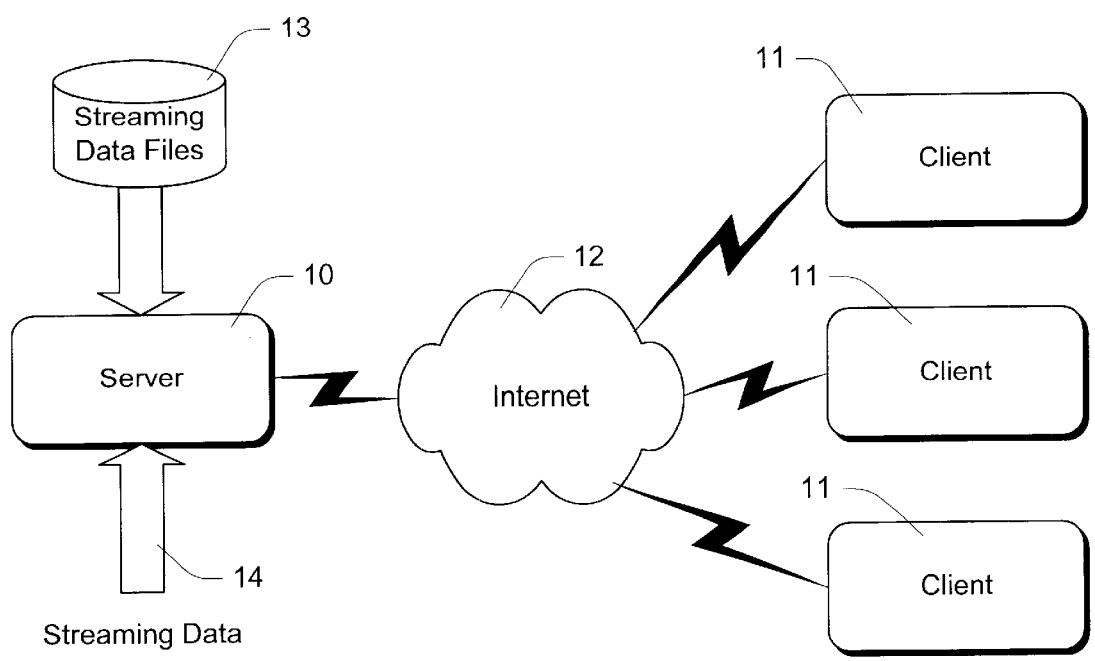
FIG. 1 is a block diagram of a networked client/server system in accordance with the invention.

FIG. 1 shows a client/server network system and environment in accordance with the invention. Generally, the system includes a network server computer 10 and a plurality of network client computers 11. The computers communicate with each other over a data communications network. The communications network in FIG. 1 comprises a public network 12 such as the Internet. The data communications network might also include local-area networks and private wide-area networks.

Server computer 10 has access to streaming media content in the form of different composite media streams. Some composite media streams might be stored as files in a database or other file storage system 13. Other composite media streams might be supplied to the server on a "live" basis from other data source components through dedicated communications channels or through the Internet itself.

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Washington.

Regardless of the streaming format used, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
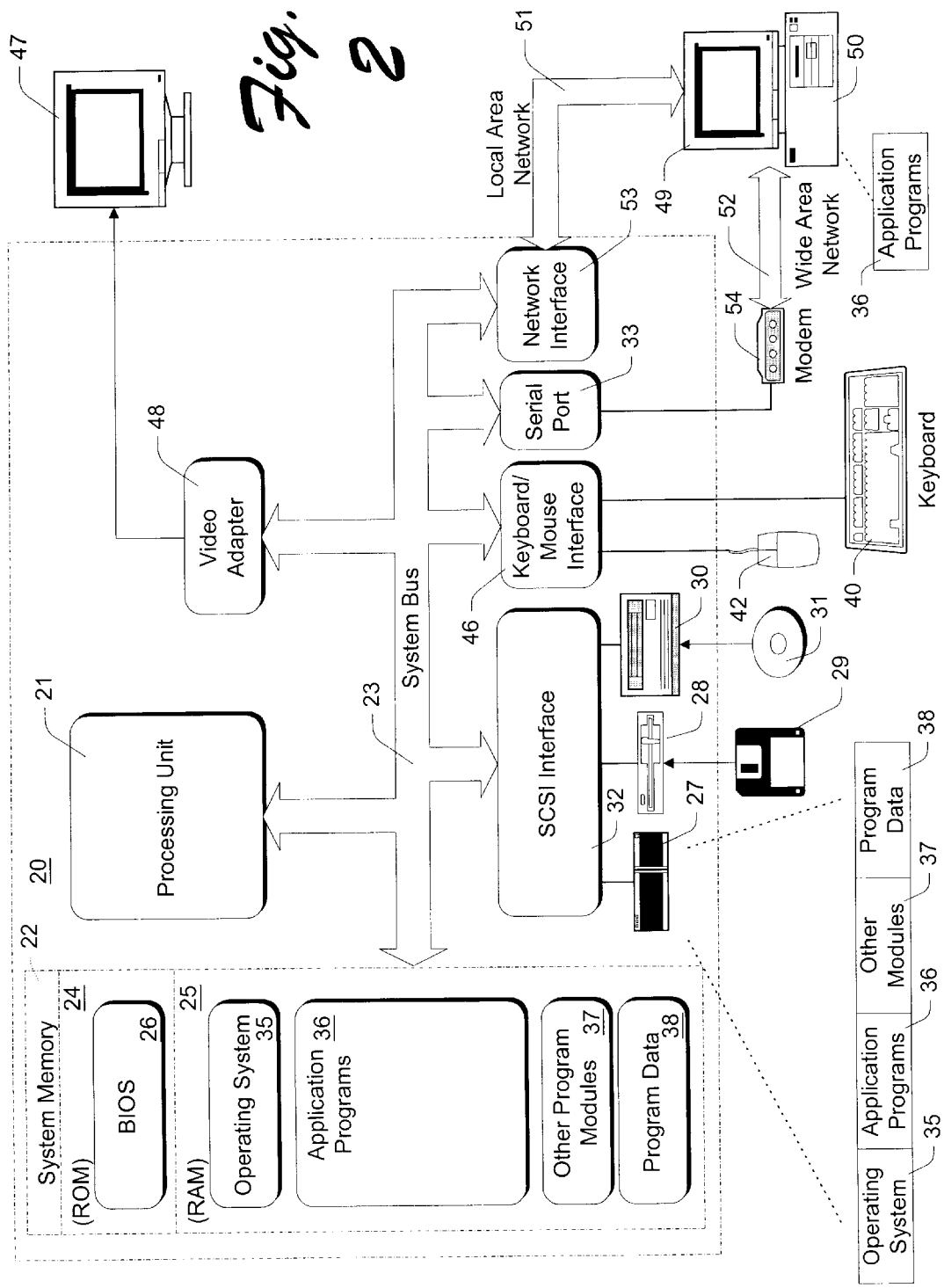
FIG. 2 is a block diagram of a networked computer that can be used to implement either a server or a client in accordance with the invention.

FIG. 2 shows a general example of a computer 20 that can be used as a network node or host in accordance with the invention. Computer 20 is shown as an example of a computer that can perform the functions of either server computer 10 or a client computer 11.

Computer 20 includes one or more processors or processing units 21, a system memory 22, and a system bus 23 that couples various system components including the system memory to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within server computer 20, such as during start-up, is stored in ROM 24. Computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Multimedia Time-Scale Modification

As shown in FIG. 1, a network system in accordance with the invention includes a network server 10 from which a plurality of composite media streams are available. In the described embodiment of the invention, the media streams are stored as files on some type of data storage device accessible by the server.

The system also includes network clients 11. Generally, the network clients are responsive to user input to select or request identified composite media streams. In response to a request for a composite media stream, server 10 streams the requested composite media stream to the requesting network client in accordance with some known format such as ASF. The client renders the data streams to produce the multimedia content.

In accordance with the invention, a network client also accepts a speed designation or playback speed from a human user. The speed designation might be a speed factor relative to the original or default playback speed of the selected multimedia stream. For example, a speed factor of 1.2 indicates that the composite media stream is to be rendered at 1.2 times its original or default speed, thereby achieving time compression. A speed factor of 0.8 indicates that the composite media stream is to be rendered at 0.8 times its original or default speed, thereby achieving time expansion.

In addition, or alternatively, the speed designation might indicate one of a plurality of different types of levels of non-linear timeline compression. As an example, such levels might include a type of non-linear timeline compression that removes audio pauses from a spoken presentation. Another level, perhaps referred to as "summary" compression, might retain only short periods of a presentation that are marked by high energy levels in either audio or video portions of the content.

In response to the speed or playback designation from the user, the client requests a composite media stream from the server, indicating the desired type, level, or degree of timeline alteration. A plurality of composite streams are available at the server, corresponding to different possible timeline alterations. In response to the request from the client, the server begins streaming a composite stream that has already had its timeline-altered in accordance with the speed designation.

With some types of media, such as video streams, timeline alteration involves either omitting selected frames or modifying the presentation times of the individual data units or video frames. In other cases, such as with audio streams, the time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting soundquality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

More information regarding audio time modification is given in an article that appeared in the March, 1997, issue of "ACM Transactions on Computer-Human Interaction" (Volume 4, Number 1, pages 3–38) (1997). For purpose of this disclosure, it can be assumed that audio time modification involves some combination of changing individual data stream samples, dropping certain samples, and adjusting presentation times of any samples that are actually rendered.

The methods mentioned above are considered "linear" because all portions of the speech signal are compressed or expanded uniformly. That is, timeline alteration is applied consistently in time and across all individual streams of a composite media stream. With non-linear techniques, on the other hand, some segments of an individual or composite stream might be more highly expanded or compressed (in time) than other segments. Furthermore, the respective individual streams of a composite stream might be expanded or compressed by different amounts relative to each other.

One example of a non-linear time-compression method is referred to as pause removal. When using this method, a speech processing algorithm attempts to identify and remove any pauses in a recording. Similar techniques might be used in conjunction with video, by identifying and removing periods of relative inactivity. Non-linear timeline-alteration presents special challenges when attempting to synchronize different streams having timelines altered by different techniques.

The need to synchronize between streams occurs, in one example, when attempting to switch between streams during playback. For example, a user might view the first two minutes of a multimedia stream at a normal or 1.0 playback speed, and then request a "pause removal" type of time compression. The system responds by streaming a new composite media stream, having the requested time compression. However, the user does not want to start over by again viewing the first two minutes of the presentation. Rather, the user wants to resume playback at the same point in the content at which the request to change the playback speed was made. This point is two minutes into the original stream, but is at some time less than two minutes into the time-compressed stream.

Figure 3:
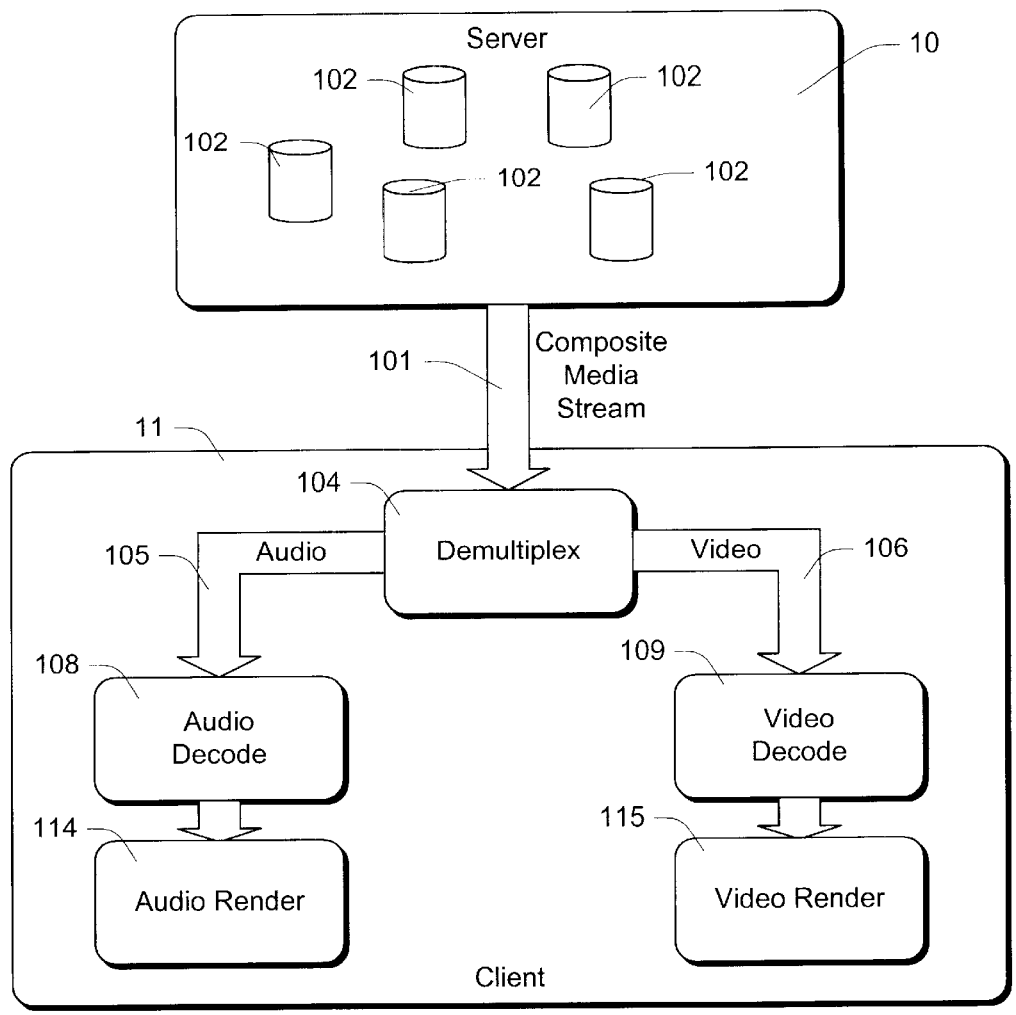
FIG. 3 illustrates the flow of a composite media stream in accordance with one embodiment of the invention.

FIG. 3 illustrates the flow of a composite media stream in accordance with one embodiment of the invention. Network server 10 streams a composite media stream 101 to network client 11. The composite media stream has a plurality of individual media streams as described above. For purposes of discussion, it is assumed in this example that the composite media stream has an audio stream and a video stream. Each media stream has a timeline, and the timelines of the individual streams are synchronized with each other so that the streams can be rendered in combination to produce coordinated multimedia content at the network client 11.

The client computer has a demultiplexer component 104 that receives the composite media stream and that separates out the individual media streams from the composite format in which the data is streamed (such as ASF). Assuming for purposes of discussion that the composite media streams consist of audio and video streams, this results in an audio stream 105 and a video media stream 106. The individual media streams are sent to and received by respective decoders 108 and 109 that perform in accordance with the particular data format being employed. For example, the decoders might perform data decompression.

The decoded data streams are then sent to and received by respective renderers 114 and 115. The rendering components render the streams in accordance with their modified timelines, as the streams continue to be streamed from the network server.

For any particular multimedia segment, the server creates and stores several versions of a composite media stream. A plurality of such composite media streams are shown in FIG. 3, referenced by numeral 102. The illustrated media streams all correspond to the same content. One of the media streams is referred to as a primary or reference version of the media stream. A primary media stream normally has a timeline that has not been altered. In addition to the primary media stream, however, the server stores a number of timeline-altered media streams, having timelines that have been altered in accordance with linear and/or non-linear techniques. In response to user's selection of a particular playback speed or time-compression method, the server selects and streams the appropriate one of the stored composite media streams to the client.

There is a known timeline correlation between the data units of the various media streams. The term "timeline correlation" as used herein refers to a correlation in content between two streams that differ in the degree and/or manner in which their timelines have been modified. Thus, a playback point one minute into an unaltered timeline correlates to a point thirty seconds into a timeline that has been linearly altered by a factor of 2.0 (accelerated to twice the speed of the original). More generally, the point in the new timeline equals oldtime(oldfactor/newfactor), where oldtime is the presentation time in the first media stream at which the speed change is to occur, oldfactor is the playback speed or factor of the old media stream, and newfactor is the playback speed or factor of the new media stream.

When non-linear timeline alteration is involved, the correlation between streams cannot be calculated in this manner. In accordance with the invention, the timeline correlations are compiled and stored as the non-linear compression is performed. The stored data is then referenced by the system when it becomes necessary to find content in one stream corresponding to the same content in another stream.

Specifically, the server stores one or more sets of timeline correlations between the timelines of the primary and timeline-altered media streams. These sets of correlations are arranged to allow each cross-referencing between the various streams. For example, one set of correlations contains mappings from presentation times of the primary media stream to timeline-correlated presentation times of the timeline-altered media streams. Other sets of correlations correspond to individual ones of the time-altered media streams. Each of these sets contains mappings from presentation times of the corresponding timeline-altered media stream to correlated presentation times of the primary media stream.

Figure 4:
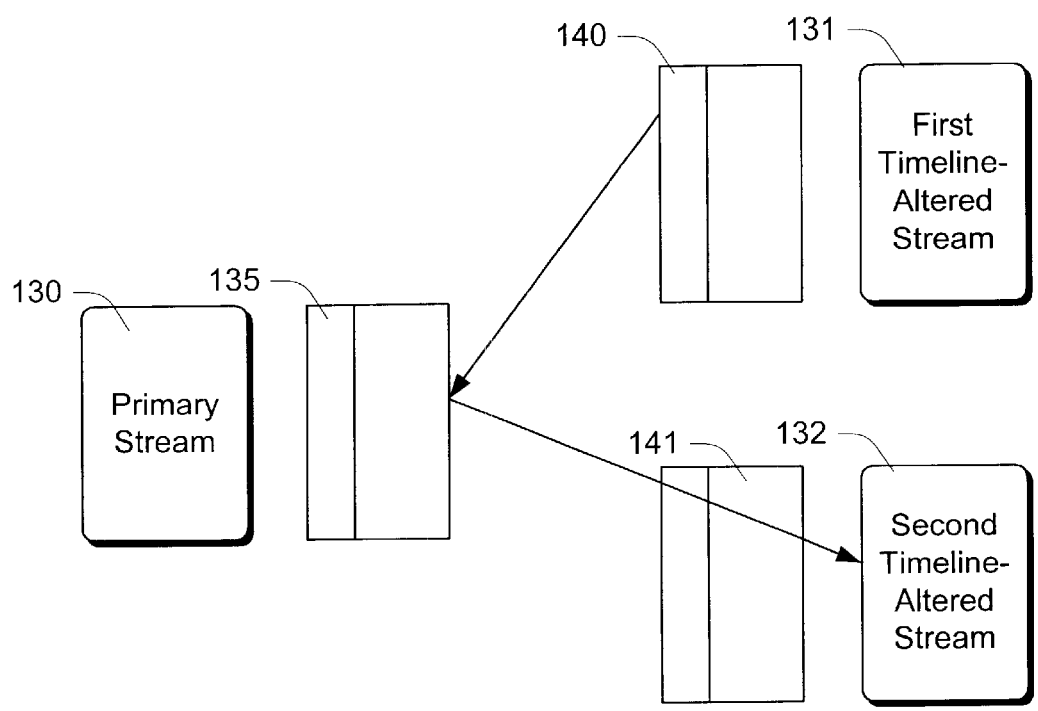
FIG. 4 illustrates timeline correlations between the timelines of the primary and timeline-altered media streams in accordance with one embodiment of the invention.

FIG. 4 illustrates this more clearly. Shown in FIG. 4 are a primary media stream 130, a first timeline-altered media stream 131, and a second timeline-altered media stream 132. In this example, the timeline-altered media streams have corresponding timelines that are non-linearly altered relative to the timeline of the primary media stream.

Also shown in FIG. 4 are reference tables or data objects corresponding to the media streams. Table 135, associated with primary media stream 130, is a cross-reference containing mappings from presentation times of the primary media stream to timeline-correlated presentation times of the first and second media streams. Table 135 is indexed by presentation times of the primary media stream. Thus, for any given presentation time of the primary media stream, it is possible to quickly find a corresponding or timeline-correlated presentation time in either of the two timeline-altered media streams.

By itself, table 135 is useful when switching from primary media stream 130 to one of the timeline-altered media streams 131 and 132. To transition, for instance, from the primary media stream to the first timeline-altered media stream, the current presentation time of the primary media stream is noted. This presentation time is used as an index into table 135 to find the correlated presentation time in the first media stream. The first media stream is then initiated at the correlated time as found in the table.

Further tables or data objects 140 and 141 are associated respectively with first and second timeline-altered media streams 131 and 132, and are used as back-references to the primary media stream. Each of these tables is indexed by the presentation times of its associated media stream, to find timeline-correlated presentation times in the primary media stream.

The tables or data objects can be stored and referenced by server 10. Alternatively, they can be stored by server 10 and downloaded to client 11 as needed. As a further alternative, the data objects with the timeline-altered media streams can be provided with individual data units of the timeline-altered media streams. In accordance with this further alternative, each data unit is accompanied by a presentation time at which the data unit is to be rendered, and also by a reference presentation time, wherein the reference presentation time indicates a presentation time in the primary reference stream that corresponds to the presentation time of the data unit in the timeline-altered media stream. This reference presentation time is then used to index table 135 associated with primary stream 130.

Figure 5:
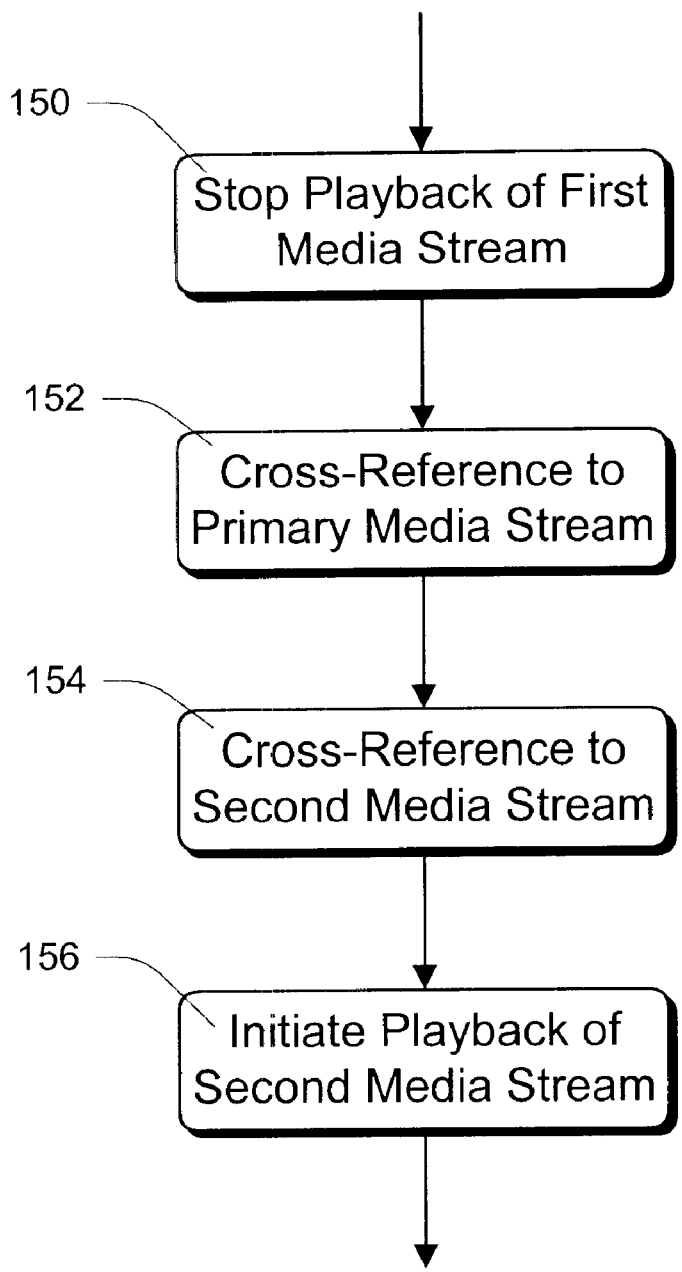
FIG. 5 illustrates the process used to find an appropriate presentation time in a second timeline-altered media stream, when switching from a first timeline-altered media stream to the second timeline-altered media stream in accordance with one embodiment of the invention.

FIG. 5 illustrates the process used to find an appropriate presentation time in the second timeline-altered media stream, when switching from the first timeline-altered media stream to the second timeline-altered media stream.

A first step 150 comprises stopping playback of the first media stream at a particular presentation time of the first media stream. A following step 152 comprises referring to a stored table or cross-reference 140 to determine a presentation time of the primary media stream that has a timeline correlation with the particular presentation time at which playback of the first media stream was stopped. Step 154 comprises referring to table 135 of primary media stream 130 to determine a presentation time of the second media stream that has a timeline correlation with the determined presentation time of the primary media stream. Step 156 comprises initiating playback of the second media stream at a point in the second media stream having a presentation time that is no greater than the determined presentation time. In the described embodiment of the invention, playback is initiated somewhat prior to the determined presentation time, thus providing a short overlap in the rendered content to provide context when initiating the second timeline-altered media stream in midstream.

The referencing steps are illustrated in FIG. 4. An arrow from the reference table 140 of first media stream 131 indicates that the table 140 is used to find a time-correlated presentation time in the primary media stream. This value is used to index table 135 of primary stream 130 to find a timeline-correlated presentation time in second media stream 132.

Conclusion

The invention described above provides an efficient way to index content in one media stream to the same content in another media stream. The described techniques allow a user to switch between different methods of timeline modification, including non-linear methods of timeline modification, without having to restart the presentation of the content. When using the invention, the user can browse or skim through streaming content at various speeds, thereby reducing the time required to assimilate such content.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of switching playback from a first media stream to a second media stream, the method comprising:
stopping playback of the first media stream at a particular presentation time of the first media stream, wherein the second media stream has a timeline that is non-linearly altered relative to the first media stream, and wherein the timeline establishes the speed at which the content of the second media stream is rendered;
referring to one or more stored cross-references to determine a beginning presentation time of the second media stream that has a timeline correlation with the particular presentation time at which playback of the first media stream was stopped, wherein the one or more stored cross-references are mappings of presentation times of the second media stream to presentation times of the first media stream; and
initiating playback of the second media stream at a point in the second media stream having a presentation time that is no greater than the determined beginning presentation time.

2. A method as recited in claim 1, wherein said point in the second media stream has a presentation time that is less than the determined beginning presentation time, so that playback of the second media stream begins at a point preceding the point where playback of the first media stream was stopped.

3. A method as recited in claim 1, wherein the media streams are composite media streams.

4. A method as recited in claim 1, wherein each of the media streams comprises one or more individual data streams that each include a sequence of data units, and wherein each data unit is associated with a presentation time that indicates when the data unit should be rendered.

5. A method of switching playback from a first media stream to a second media stream, wherein the second media stream has a timeline that is altered relative to the first media stream, the method comprising:

stopping playback of the first media stream at a particular presentation time of the first media stream;

determining, by accessing a mapping of presentation times of the first media stream to presentation times of the second media stream, a beginning presentation time of the second media stream that has a timeline correlation with the particular presentation time at which playback of the first media stream was stopped; and initiating playback of the second media stream at a point in the second media stream having a presentation time that is no greater than the determined beginning presentation time.

6. A method as recited in claim 5, wherein said point in the second media stream has a presentation time that is less than the determined beginning presentation time, so that playback of the second media stream begins at a point preceding the point where playback of the first media stream was stopped.

7. A method as recited in claim 5, wherein the media streams are composite media streams.

8. A method as recited in claim 5, wherein each of the first media stream and the second media stream comprises one or more individual data streams that each include a sequence of data units, and wherein each data unit is associated with a presentation time that indicates when the data unit should be rendered.

9. One or more computer-readable storage media containing a computer-executable program that switches playback from a first media stream to a second media stream, wherein the first and second media streams have timelines that are non-linearly altered relative to a primary media stream, the program including instructions that are executable to perform steps comprising:

stopping playback of the first media stream at a particular presentation time of the first media stream;

referring to one or more cross-references to determine a presentation time of the primary media stream that has a timeline correlation with the particular presentation time at which playback of the first media stream was stopped, wherein at least one of the one or more cross-references are mappings of presentation times of the first media stream to presentation times of the primary media stream;

referring to said one or more cross-references to determine a beginning presentation time of the second media stream that has a timeline correlation with the determined presentation time of the primary media stream, wherein at least one of the one or more cross-references are mappings of presentation times of the primary media stream to presentation times of the second media stream; and initiating playback of the second media stream at a point in the second media stream having a presentation time that is no greater than the determined beginning presentation time.

10. One or more computer-readable storage media as recited in claim 9, wherein said point in the second media stream has a presentation time that is less than the determined beginning presentation time, so that playback of the second media stream begins at a point preceding the point where playback of the first media stream was stopped.

11. One or more computer-readable storage media as recited in claim 9, wherein the media streams are composite media streams.

12. One or more computer-readable storage media as recited in is claim 9, wherein each of the media streams comprises one or more individual data streams that each include a sequence of data units, and wherein each data unit is associated with a presentation time that indicates when the data unit should be rendered.

13. One or more computer-readable storage media having stored thereon a data structure, the data structure comprising:

a primary media stream having a corresponding timeline;

a plurality of timeline-altered media streams, the timeline-altered media streams having corresponding timelines that are non-linearly altered relative to the timeline of the primary media stream;

one or more sets of timeline correlations between the timelines of the primary and timeline-altered media streams, each set of timeline correlations identifying, for a presentation time of one of the media streams, a timeline-correlated presentation time in another of the media streams.

14. One or more computer-readable storage media as recited in claim 13, wherein the sets of correlations comprise:

mappings from presentation times of the primary media stream to correlated presentation times of the timeline-altered media streams.

15. One or more computer-readable storage media as recited in claim 13, wherein the sets of correlations comprise:

mappings from presentation times of the primary media stream to correlated presentation times of the timeline-altered media streams;

mappings from presentation times of the timeline-altered media streams to correlated presentation times of the primary media stream.

16. One or more computer-readable storage media as recited in claim 13, wherein the timeline-altered media streams include data units and corresponding presentation times, and wherein the sets of correlations comprise:

mappings associated with the data units of the timeline-altered media streams from the presentation times of the timeline-altered media streams to correlated presentation times of the primary media stream.

17. One or more computer-readable storage media as recited in claim 13, wherein the sets of correlations comprise one or more tables that are indexed by presentation times of the primary media stream, the one or more tables containing mappings from presentation times of the primary media stream to correlated presentation times of the timeline-altered media streams.

18. One or more computer-readable storage media as recited in claim 13, wherein the sets of correlations comprise:

one or more tables that are indexed by presentation times of the primary media stream, the one or more tables containing first mappings that correlate presentation times of the primary media stream to presentation times of the timeline-altered media streams;

second mappings corresponding to presentation times of the timeline-altered media streams, wherein each second mapping indicates a correlated presentation time of the primary media stream.

19. One or more computer-readable storage media as recited in claim 13, wherein the timeline-altered media streams include data units and corresponding presentation times, and wherein the sets of correlations comprise:

one or more tables that are indexed by presentation times of the primary media stream, the one or more tables containing first mappings that correlate presentation times of the primary media stream to presentation times of the timeline-altered media streams;

second mappings associated with the data units of the timeline-altered media streams from the presentation times of the timeline-altered media streams to correlated presentation times of the primary media stream.

20. One or more computer-readable storage media as recited in claim 13, wherein the sets of correlations comprise:

a first reference table corresponding to the primary media stream, the first reference table being indexed by presentation times of the primary media stream and containing first mappings that correlate presentation times of the primary media stream to presentation times of the timeline-altered media streams;

a second reference table corresponding to each of the timeline-altered media streams, each of the second reference tables being indexed by presentation times of its corresponding timeline-altered media stream and containing second mappings that correlate the presentation times of the timeline-altered media streams to presentation times of the primary media stream.

21. One or more computer-readable storage media as recited in claim 13, wherein the media streams are composite media streams.

22. A multimedia computer server comprising:

one or more computer-readable storage media;

a primary media stream stored on the one or more computer-readable storage media;

a plurality of timeline-altered media streams stored on the one or more computer-readable storage media, the timeline-altered media streams having corresponding timelines that are non-linearly altered relative to the primary media stream;

first mappings, stored on the one or more computer-readable storage media, used to map presentation times of the primary media stream to timeline-correlated presentation times of the timeline-altered media streams;

second mappings, stored on the one or more computer-readable storage media, used to map presentation times of the timeline-altered media streams to timeline-correlated presentation times of the primary media stream.

23. A multimedia computer server as recited in claim 22, wherein the first mappings are contained in one or more tables that are indexed by presentation times of the primary media stream.

24. A multimedia computer server as recited in claim 22, wherein:

the first mappings are contained in one or more tables that are indexed by presentation times of the primary media stream;

the second mappings are contained in one or more tables that are indexed by presentation times of the timeline-altered media streams.

25. A multimedia computer server as recited in claim 22, wherein the timeline-altered media streams have data units and associated presentation times and wherein:

the first mappings are associated with the data units of the primary media stream;

the second mappings are associated with the data units of the timeline-altered media streams.

26. A multimedia computer server as recited in claim 22, wherein the media streams are composite media streams.

* * * * *

UNITED STATES PATENT AND TRADEMARK OFFICE
CERTIFICATE OF CORRECTION

PATENT NO.    : 6,415,326 B1
DATED         : July 2, 2002
INVENTOR(S)   : Gupta

It is certified that error appears in the above-identified patent and that said Letters Patent is hereby corrected as shown below:

Column 7,
Line 17, replace "soundquality." with -- sound quality. --.
Line 36, replace "purpose" with -- purposes --.

Column 12,
Line 15, delete "is" after "in"

Signed and Sealed this

Seventh Day of January, 2003

JAMES E. ROGAN
*Director of the United States Patent and Trademark Office*